United States Patent
Arthaud

[11] 4,015,499
[45] Apr. 5, 1977

[54] DEVICE FOR MOUNTING ON A MACHINE TO ALLOW THE MACHINE TO BE USED AS A SAW

[76] Inventor: Jacques Arthaud, 5, Allee du Bresil, 91300 Massy, France

[22] Filed: Nov. 3, 1975

[21] Appl. No.: 628,428

[52] U.S. Cl. .................................. 83/752; 83/588; 83/651.1
[51] Int. Cl.² ........................................ B27B 19/02
[58] Field of Search ......... 83/752, 785, 588, 651.1, 83/581.1

[56] References Cited
UNITED STATES PATENTS

| | | | |
|---|---|---|---|
| 1,181,694 | 5/1916 | Svenson | 83/752 X |
| 2,072,590 | 3/1937 | Lowry et al. | 83/752 |
| 2,107,174 | 2/1938 | Boice | 83/752 |
| 2,208,843 | 7/1940 | Hedgpeth | 83/752 |
| 2,295,764 | 9/1942 | Taylor | 83/752 X |
| 2,792,033 | 5/1957 | Bradley | 83/752 X |

Primary Examiner—Frank T. Yost
Attorney, Agent, or Firm—Young & Thompson

[57] ABSTRACT

A device for mounting on a machine to allow the machine to be used as a saw comprises a member for securing to the machine. A tension spring is connected to one extremity of said member, the other end of the tension spring connected to one end of a saw blade or wire. The device comprises also means connected to the other end of the saw blade or wire and for connection to a spindle of a motor of a machine and for converting rotary motion of the spindle to reciprocating rectilinear motion and imparting the reciprocating rectilinear motion to the saw blade or wire.

4 Claims, 1 Drawing Figure

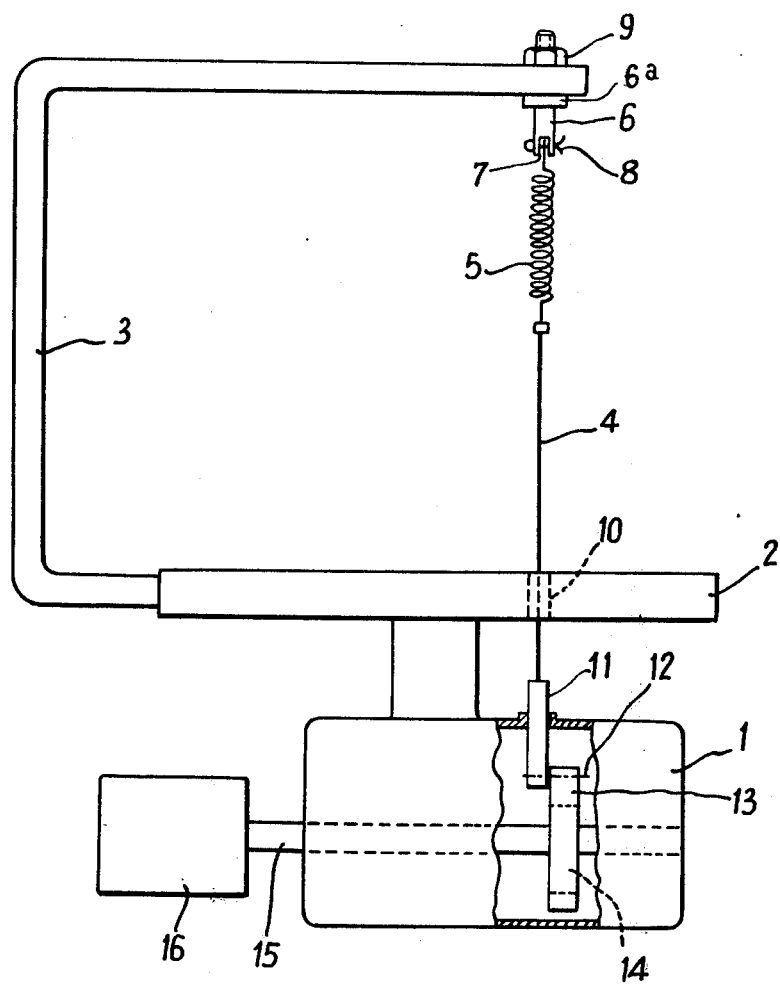

4,015,499

DEVICE FOR MOUNTING ON A MACHINE TO ALLOW THE MACHINE TO BE USED AS A SAW

FIELD OF THE INVENTION

The present invention relates to a device for mounting on a machine to allow the machine to be used as a saw.

THE PRIOR ART

Normal jig saws are difficult to handle. With some normal jig saws, the user must impart a reciprocating movement to the saw whilst following an outline. Other normal jig saws are equipped with vibrators and may be used whilst stationary or whilst guided manually. However, normal jigs saws equipped with a vibrator heat up quickly. Consequently the user is forced to interrupt his work periodically.

Convertible machines are known, which may be used as drilling or punching machines and on which it is possible to install a saw blade, thereby enabling the machine to be used as a saw. To enable such machines to be used as fret saws, the saw blade projects from the machine, only one end of the blade being attached to the machine. Consequently, the saw blade must be thick and cannot be formed by a single jig saw wire. It is impossible to perform precise sawing operations with the machine.

Saws are also known which comprise a stationary arm to which one end of a saw blade is secured by elastic means, the other end of the blade being connected to the spindle of a motor by means converting the rotary movement of the spindle into an rectilinear reciprocating motion.

In such saws, the elastic means comprises a compression spring. The compression spring tends to cause undesirable outward displacement of a guided rod to which the saw blade is fastened.

It is impractical to use a thin saw blade or a saw wire with such a machine because, if such a saw blade or wire is used, a considerable curvature of the blade or wire is caused at the point of operation and the wire or blade breaks rapidly.

OBJECT OF THE INVENTION

It is an object of the present invention to provide a device for mounting on a machine to allow the machine to be used as a saw.

SUMMARY OF THE INVENTION

The device according to the invention comprises a member for securing to the machine; a tension spring connected to one extremity of said member, the other end of the tension spring being connected to one end of a saw blade or wire; and means connected to the other end of the saw blade or wire and for connection to a spindle of a motor of a machine and for converting rotary motion of the spindle to reciprocating rectilinear motion and imparting the reciprocating rectilinear motion to the saw blade or wire.

During the sawing operation, the spring which is not being guided, is directed towards the piece which is to be sawn so that the sawing angle is reduced; the wire or blade acquiring relatively little curvature, has a substantial service life.

DESCRIPTION OF DRAWING

A device embodying the invention is described below by way of example with reference to the accompanying drawing which show the device in elevation.

The device shown in the drawing comprises a housing 1. When the device is to be used the housing 1 is secured on a convertible machine (not shown). The housing 1 is rigidly attached to a saw table 2. A U-shaped member 3 is secured to the table 2. A saw wire blade 4 is secured at its upper end to one extremity of a tension spring 5. The other extremity of the spring 5 is fastened to a freestanding extremity of the member 3 as described below.

One end portion of a threaded rod 6 is provided with a slot 7. Said one extremity of the spring 5 is secured in the slot 7 by means of a split pin 8. The rod 6 has a flange 6a intermediate its ends, which flange bears against the underside of the freestanding extremity of the member 3. The rod is held in position by a nut 9. By loosening the nut 9, the spring 5 may be pivoted about its axis to set the wire or blade 4 in a desired direction.

The lower portion of the wire or blade 4 passes through an opening 10 of the table 2 and the end lower of the wire or blade 4 is secured to a rod 11. The rod 11 is articulated at 12 on a coupling crank 13. The coupling crank 13 is rotatably mounted on an eccentric bearing surface 14 or a driving spindle 15. The spindle 15 projects from the housing 1 and terminates in a coupling 16. The coupling 16 is for connecting the spindle 15 to a spindle of a motor of the convertible machine.

To use the device, the housing 1 is secured on the convertible machine and the spindle 15 is connected to the spindle of the motor of the convertible machine by means of the coupling 16.

In operation of the machine, the spindle of the motor rotates and impacts rotary motion to the eccentric bearing surface 14 through the spindle 15.

The rotating eccentric bearing surface 14 impacts reciprocating rectilinear motion through the crank 13 and the rod 11 to the wire or blade 4.

What I claim is:

1. A power driven jig saw comprising a saw wire, a tension spring secured to one end of the saw wire, power means connected to the other end of the saw wire to reciprocate the saw wire against the tension of the tension spring, the tension spring being secured to the saw wire at one end of the tension spring, and means for selectively fixing the other end of the tension spring in any of a plurality of adjusted positions of rotation of said other end of the tension spring about the axis of the tension spring.

2. A jig saw as claimed in claim 1, said fixing means comprising a rod to one end of which said other end of said tension spring is secured, and means for releasably clamping said rod to a fixed member in any of a plurality of positions of rotation of said rod about the axis said rod.

3. A jig saw as claimed in claim 2, said clamping means comprising a flange on said rod and a nut screwthreadedly received on said rod for releasably clamping said fixed member between said nut and said flange.

4. A jig saw as claimed in claim 1, said other end of said saw wire being secured to a rod that slides in a hole in a fixed housing that contains said reciprocating means.

* * * * *